United States Patent
Ogura et al.

(10) Patent No.: US 12,112,133 B2
(45) Date of Patent: Oct. 8, 2024

(54) MULTI-MODEL APPROACH TO NATURAL LANGUAGE PROCESSING AND RECOMMENDATION GENERATION

(71) Applicant: Avanade Holdings LLC, Wilmington, DE (US)

(72) Inventors: Takashi Ogura, Tokyo (JP); Yu Nakahara, Aomori (JP); Naoki Hirose, Kanagawa (JP)

(73) Assignee: Avanade Holdings LLC, Wilmington, DE (US)

( * ) Notice: Subject to any disclaimer, the term of this patent is extended or adjusted under 35 U.S.C. 154(b) by 475 days.

(21) Appl. No.: 17/445,074

(22) Filed: Aug. 13, 2021

(65) Prior Publication Data
US 2023/0046851 A1    Feb. 16, 2023

(51) Int. Cl.
G06F 40/289    (2020.01)
G06F 40/194    (2020.01)
(Continued)

(52) U.S. Cl.
CPC .......... *G06F 40/289* (2020.01); *G06F 40/30* (2020.01)

(58) Field of Classification Search
CPC ...... G06F 40/289; G06F 40/30; G06F 40/194; G06F 40/216; G06F 40/284;
(Continued)

(56) References Cited

U.S. PATENT DOCUMENTS 5,680,511 A * 10/1997 Baker ................. G10L 15/1815
704/E15.024
6,418,431 B1  7/2002 Mahajan et al.
(Continued)

FOREIGN PATENT DOCUMENTS

CN    111144723 A    5/2020
JP    2002510076 A    4/2002
(Continued)

OTHER PUBLICATIONS

Zaroor, Abeer, et al., "A Hybrid Approach to Conceptual Classification and Ranking of Resumes and Their Corresponding Job Posts," The Arab American University, May 2017, 14 pages.
(Continued)

*Primary Examiner* — Leshui Zhang
(74) *Attorney, Agent, or Firm* — Polsinelli P.C.

(57) ABSTRACT

In some implementations, a device may monitor a set of data sources to generate a set of language models corresponding to the set of data sources. The device may determine a plurality of sets of keyword groups. The device may generate a plurality of sets of skill catalogs. The device may receive a source document for processing. The device may process the source document to extract a key phrase set and to determine a first similarity distance. The device may select a corresponding skill catalog and an associated language model based on a relevancy value. The device may determine second similarity distances between the source document and one or more target documents using the corresponding skill catalog and the associated language model. The device may output information associated with one or more target documents based at least in part on the second similarity distances.

9 Claims, 10 Drawing Sheets

(51) Int. Cl.
  *G06F 40/216* (2020.01)
  *G06F 40/30* (2020.01)
(58) Field of Classification Search
  CPC ............ G06F 16/3329; G06F 16/3344; G06F 16/9535; G06F 16/35; G06F 16/24575; G06F 16/24578; G06F 16/24522; G06F 16/313; G06F 16/951; G06F 16/334; G06F 16/93; G06F 16/3331; G06Q 10/1053; G06Q 10/063112; G06N 20/00; G06N 3/08
  USPC ........................................................ 704/1–9
  See application file for complete search history.

(56) References Cited

U.S. PATENT DOCUMENTS

| | | | | |
|---|---|---|---|---|
| 8,751,217 | B2* | 6/2014 | Ballinger | G10L 15/18 704/251 |
| 10,388,272 | B1* | 8/2019 | Thomson | G10L 15/22 |
| 2004/0198597 | A1 | 10/2004 | Ovshinsky | |
| 2007/0078822 | A1 | 4/2007 | Cucerzan et al. | |
| 2014/0101691 | A1* | 4/2014 | Sinha | G06F 16/7867 725/32 |
| 2014/0200878 | A1* | 7/2014 | Mylonakis | G06F 40/51 704/4 |
| 2018/0330331 | A1 | 11/2018 | Nair et al. | |
| 2019/0341030 | A1* | 11/2019 | Hammons | G10L 17/00 |
| 2019/0355043 | A1* | 11/2019 | Swierk | G06N 5/02 |
| 2020/0193382 | A1* | 6/2020 | Michaels | G06F 40/289 |
| 2021/0027785 | A1* | 1/2021 | Kahan | G06F 16/433 |
| 2021/0049536 | A1* | 2/2021 | Krohn | G06N 20/00 |
| 2021/0109769 | A1* | 4/2021 | Yang | G06F 40/30 |
| 2021/0182935 | A1* | 6/2021 | Malkiel | G06F 16/3347 |
| 2022/0004683 | A1* | 1/2022 | Crabtree | G06F 8/10 |

FOREIGN PATENT DOCUMENTS

| | | |
|---|---|---|
| JP | 2018124729 A | 8/2018 |
| JP | 6596565 B1 | 10/2019 |

OTHER PUBLICATIONS

Suhas H E, et al., "Differential Hiring using a Combination of NER and Word Embedding," International Journal of Recent Technology and Engineering (IJRTE), May 2020, 6 pages.

Wang P., "Simple Skill-based Job Recommendation Engine," AI Journey, https://ai-journey.com/2018/10/simple-skill-based-job-recommendation-engine/, Oct. 2018.

Mira, "AI Matching Connects Candidates and Jobs," Talent Adore, https://talentadore.com/ai-matching-recruitment/, Jun. 2019.

* cited by examiner

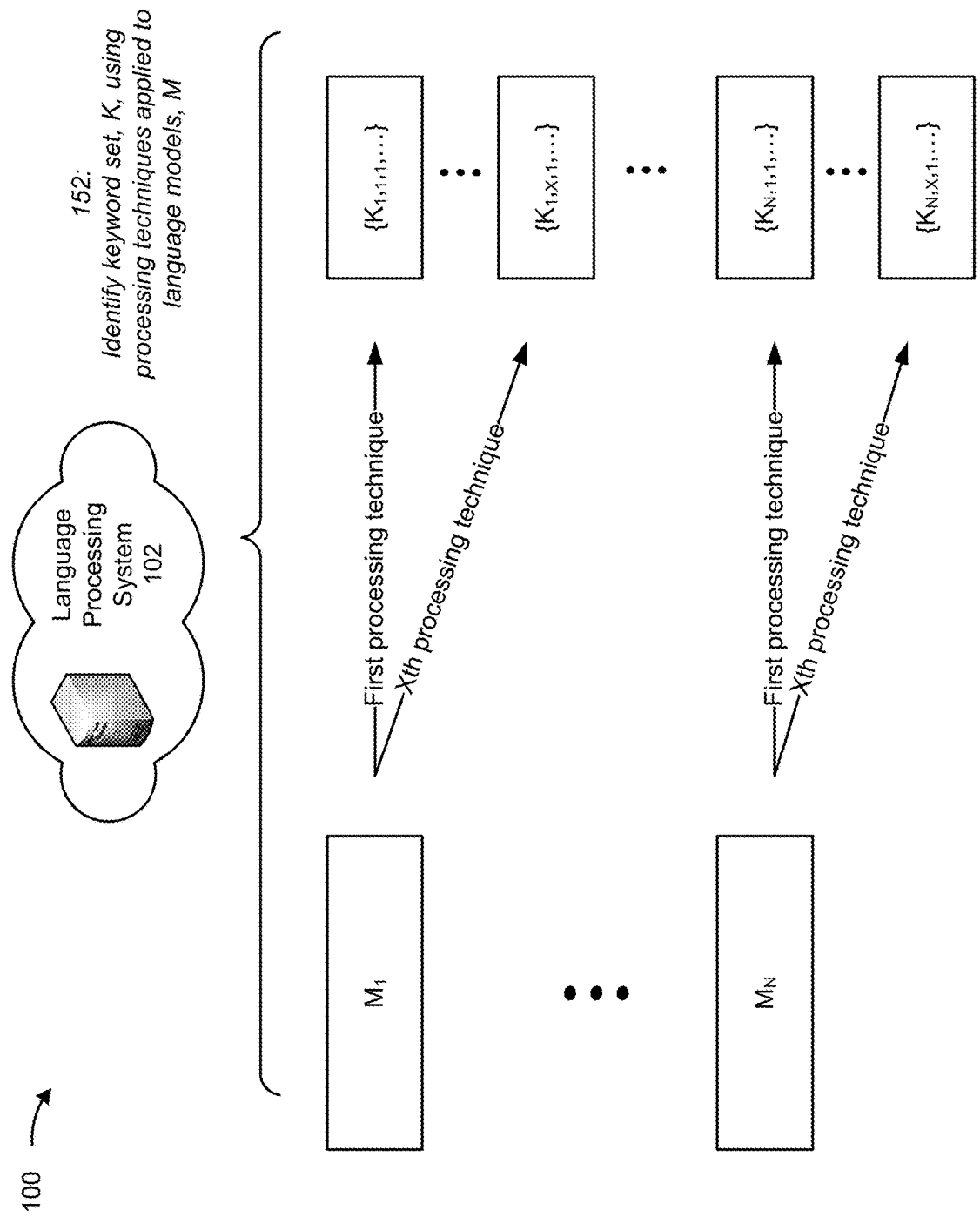

MULTI-MODEL APPROACH TO NATURAL LANGUAGE PROCESSING AND RECOMMENDATION GENERATION

BACKGROUND

Natural language processing (NLP) is an area of computer science and artificial intelligence concerned with the interactions between computers and human (natural) languages, in particular how to program computers to process large amounts of natural language data. Many different techniques may be used for natural language processing, such as symbolic natural language processing techniques, statistical natural language processing techniques, or neural natural language processing techniques, among other examples.

SUMMARY

Some implementations described herein relate to a method. The method may include monitoring, by a device, a set of data sources to generate a set of language models corresponding to the set of data sources. The method may include determining, by the device, a plurality of sets of keyword groups for the set of language models such that each language model, of the set of language models, is associated with a corresponding set of keyword groups. The method may include generating, by the device, a plurality of sets of skill catalogs based on the set of language models and the plurality of sets of keyword groups, such that each keyword group is associated with a skill catalog of the plurality of sets of skill catalogs, and such that each language model, of the set of language models, is associated with a corresponding set of skill catalogs. The method may include receiving, by the device and based on generating the set of dynamic language models for each dynamic catalog, a source document for processing. The method may include processing, by the device, the source document to extract a key phrase set and to determine, for each key phrase of the key phrase set, a first similarity distance to each skill of a corresponding skill catalog of the plurality of sets of skill catalogs, wherein an average (or other statistical technique, such as a median, mode, standard deviation, etc. applied to similarity distances) of similarity distances for the corresponding skill catalog represents a relevancy between the target content, the corresponding skill catalog, and an associated language model. The method may include selecting, by the device, the corresponding skill catalog and the associated language model based on the relevancy value. The method may include determining second similarity distances between the source document and one or more target documents using the corresponding skill catalog and the associated language model. The method may include outputting information associated with one or more target documents based at least in part on the second similarity distances.

Some implementations described herein relate to a device. The device may include one or more memories and one or more processors coupled to the one or more memories. The one or more processors may be configured to monitor a set of data sources to generate a set of language models corresponding to the set of data sources. The one or more processors may be configured to generate a plurality of sets of catalogs for the set of language models, such that a language model, of the set of language models, is associated with a corresponding set of catalogs, of the plurality of sets of catalogs, and such that the corresponding set of catalogs includes a plurality of catalogs corresponding to a plurality of different natural language processing algorithms. The one or more processors may be configured to receive, based on generating the set of catalogs for each language model, a source document for processing. The one or more processors may be configured to process the source document to generate a plurality of sets of relevancy scores, wherein a relevancy score of a set of relevancy scores, of the plurality of sets of relevancy scores, represents a relevancy value between the source document and a catalog, of the corresponding set of catalogs, of the plurality of sets of catalogs. The one or more processors may be configured to select the language model and an associated catalog, of the plurality of sets of catalogs, based on the relevancy score. The one or more processors may be configured to determine similarity scores between the source content and a target content using the selected language model. The one or more processors may be configured to generate, using a recommendation engine, a set of recommendations based on the similarity scores. The one or more processors may be configured to output information associated with the set of recommendations.

Some implementations described herein relate to a non-transitory computer-readable medium that stores a set of instructions for a device. The set of instructions, when executed by one or more processors of the device, may cause the device to generate a set of language models corresponding to a set of data sources. The set of instructions, when executed by one or more processors of the device, may cause the device to generate a plurality of sets of catalogs. The set of instructions, when executed by one or more processors of the device, may cause the device to receive, based on generating the plurality of sets of catalogs, a source content for processing. The set of instructions, when executed by one or more processors of the device, may cause the device to process the source content to generate a plurality of sets of relevancy scores corresponding to the plurality of sets of catalogs. The set of instructions, when executed by one or more processors of the device, may cause the device to select a language model, from the set of language models, and an associated catalog, of the plurality of sets of catalogs, based on the plurality of sets of relevancy scores. The set of instructions, when executed by one or more processors of the device, may cause the device to determine similarity scores between the source content and a target content using the selected language model and the associated catalog. The set of instructions, when executed by one or more processors of the device, may cause the device to output information associated with target content based at least in part on the similarity scores.

BRIEF DESCRIPTION OF THE DRAWINGS

FIGS. 1A-1G are diagrams of an example implementation described herein.

DETAILED DESCRIPTION

Figure 1A:
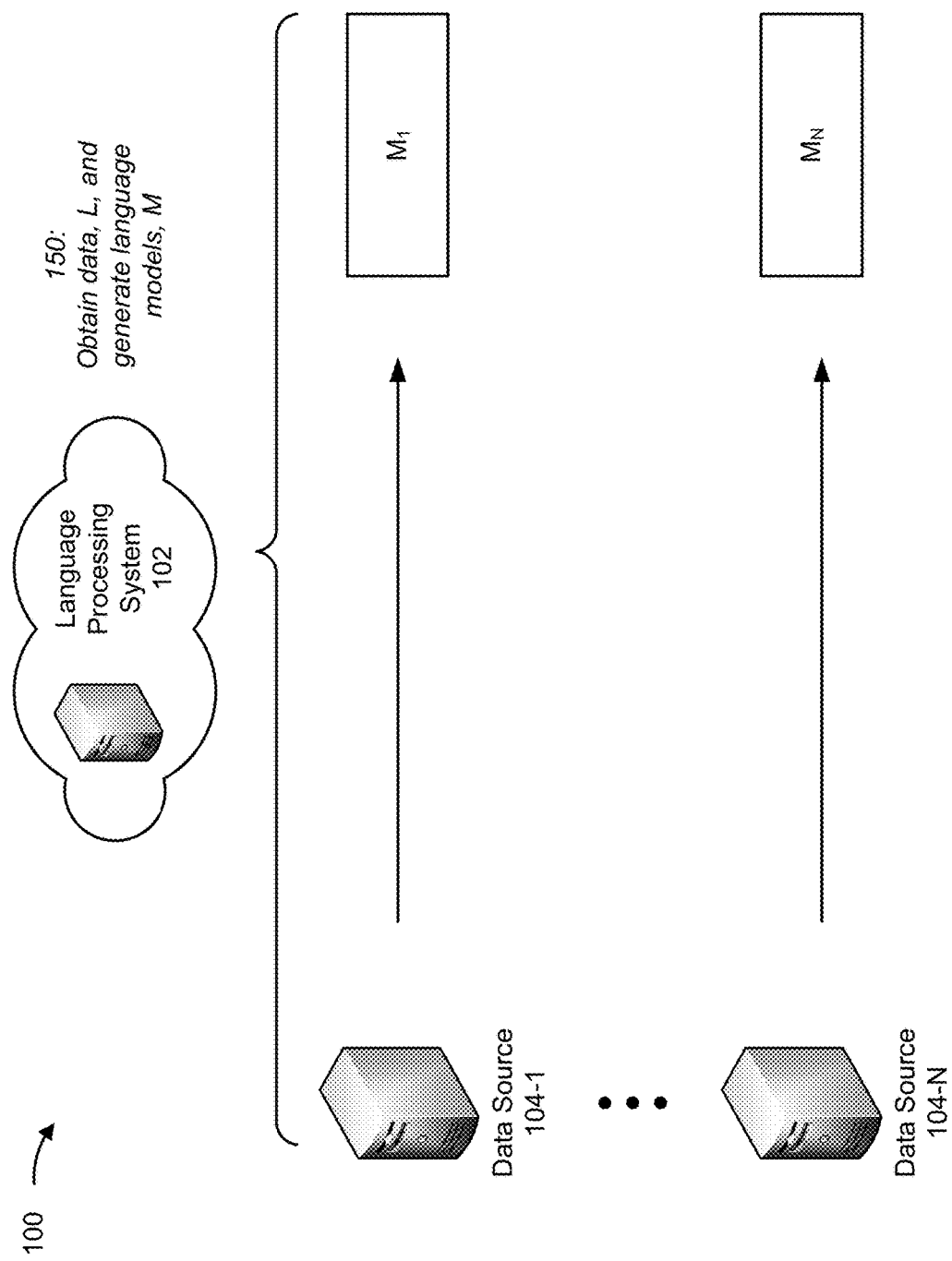

The following detailed description of example implementations refers to the accompanying drawings. The same reference numbers in different drawings may identify the same or similar elements.

In natural language modeling, a language model is a representation of dataset that enables a natural language processing entity (e.g., a device) to predict a probability of a sequence of words. Different natural language processing entities may use different language models, such as a statistical language model (e.g., an N-grams based model, a Hidden Markov Model (HMM) based model, or a linguistic rule based model) or a neural language model, among other examples. For example, an entity (e.g., an organization) that is interested in matching prospective employees to jobs may train a language model on a corpus of resumes and job listings to enable natural language processing targeted at matching prospective employees to jobs. By training a language model on a corpus specific to a field in which an associated natural language processing entity is to operate, an entity may achieve a higher level of accuracy than using a generic language model (e.g., trained on a random or pseudo-random corpus of documents) applied to a specific field.

However, document corpuses are regularly changing and many different factors may be involved in performing a successful prediction using input data. For example, a language model can be generated using a master data set that is based on structural, uniform, and static data. However, underlying assumptions based on the master data set may become inaccurate as language changes or as a context of predictions changes. For example, when predicting whether an identified skillset of an employee matches a job listing for a particular job, a prediction in a first industry may not be accurate when applied to a second industry or may be accurate for the first industry at a first time but not at a second, subsequent time. In other words, as an environment in which predictions are made changes (e.g., there are technological advances that implicate a job listing and skills associated therewith), predictions based on a static corpus may become inaccurate. Because language models are based on millions or even billions of data points, it is impractical for an operator to manually maintain a relevance of a language model.

Moreover, when language models have been applied to predictions, the language models are trained for semantic similarity. For example, a language model may be trained to predict whether a person's skill in programming matches a job listing relating to software development. However, prediction is much more complex than mere matching, and language models fail to account for other factors, such as strength of a skill (e.g., how experienced a person is in a skill) or strength of a desire (e.g., how much a person wants to use a particular skill or enter a particular industry), among other factors. As a result, attempts to use language models for prediction have resulted in poor performance, such as failure to identify job listings in which a prospective employee is actually interested. This issue may result in excessive use of computing resources from the language model having to identify more possible matches and the prospective employee having to view more possible matches because many of the possible matches are poor matches. Similarly, attempts to use language models for prediction have resulted in employees being assigned to roles that are poor fits, which may result in frequent reassignment and an associated frequent reuse of a language model. Thus, improving an accuracy of natural language processing-based predictions can reduce a utilization of computing resources by improving an accuracy of predictions performed using those computing resources.

Some implementations described herein enable similarity determinations and predictions using multi-model natural language processing. For example, a language processing system may use multiple data sources to generate multiple language models and, for each language model, multiple possible skill catalogs. The language processing system may assess, for each prediction, the multiple possible skill catalogs to select a skill catalog most appropriate for a particular prediction that the language processing system is to perform. For example, the language processing system may use a first data source relating to a first industry and multiple types of natural language processing techniques to generate a first set of models and a second data source relating to a second industry and the multiple types of natural language processing techniques to generate a second set of models. In this case, based on an industry for which the prediction is being performed and, for example, a type of prediction, the language processing system may assess a particular model (e.g., generated from a particular data source and a particular natural language processing technique) as a most appropriate model and may use the particular model for performing the prediction. In this way, the language processing system enables more dynamic and accurate predictions, which may improve a likelihood that a prediction is considered to be accurate (e.g., a prospective employee is matched with a job listing or a current employee is matched with a role). Although some implementations are described in terms of employees and job listings, other contexts for multi-model prediction are also contemplated, such as for marketing targeting, educational role assignment, semantic searching, or healthcare diagnostics, among other examples.

FIGS. 1A-1G are diagrams of an example 100 associated with a multi-model approach to natural language processing and recommendation generation. As shown in FIGS. 1A-1G, example 100 includes a language processing system 102, among other devices. These devices are described in more detail in connection with FIGS. 2 and 3.

As shown in FIG. 1A, and by reference number 150, language processing system 102 may obtain data and generate a set of language models. For example, language processing system 102 may obtain data from data sources 104-1 through 104-N to generate language models $M_1$ through $M_N$. In some aspects, data sources 104 may include external devices (e.g., servers or databases) with which language processing system 102 may communicate via a network. Additionally, or alternatively, data sources 104 may be co-located with language processing system 102 (e.g., co-located in a single server system or in a single cloud deployment).

In some implementations, language processing system 102 may obtain the data from a particular set of sources to enable generation of a skill catalog, as described herein. For example, language processing system 102 may communicate with a set of servers to monitor and obtain data from public sources, such as a news source, an academic publishing source, a social media feed source, a company description source, or a reference source, among other examples. Additionally, or alternatively, language processing system 102 may communicate with a set of servers to monitor and obtain data from private sources, such as a set of job listings, a set of job applications, a set of employee descriptions of job roles, a set of job offer letters, or a set of intra-office communications, among other examples. In this way, language processing system 102 obtains data sets $L_1$ through $L_N$ (not shown) from which to generate language models $M_1$ through $M_N$, as described herein.

In some implementations, language processing system 102 may generate the set of language models using one or more data processing techniques. For example, language processing system 102 may apply an artificial intelligence natural language processing technique, such as Word2vec, fastText, GloVe, vector space modeling, normalized compression distance determination, or feature learning, among other examples, to generate a language model $M_i$ from a data set $L_i$. In this way, language processing system 102 builds many different language models from many different corpuses (the data sets L), thereby enabling language processing system 102 to select a most appropriate model for a particular target document that is to be processed, as described herein. In other words, a first language model that is trained for semantic interpretation based on a first data set may be more appropriate for parsing a target document with a similar semantic meaning to data in the first data set than a second language model that is trained for semantic interpretation based on a second data set with a different semantic meaning than the target document. In this way, by generating multiple language models, language processing system 102 improves a likelihood that a semantic interpretation of at least one language model matches a target document relative to using a single, static language model used in other techniques.

In some implementations, language processing system 102 may weight an element differently in different language models when generating the set of language models. For example, as described above, when generating a first language model, language processing system 102 may assign a first weight to an element, but may assign a second, different weight to the element in a second language model. In this case, a word such as "Java" may be assigned a high weight, indicating importance, in a language model generated from a corpus of computer-science documents and a low weight, indicating lack of importance, in a language model generated from a corpus of travel agency training materials. In other words, programming in the language "Java" may be classified as a useful skill to a computer programmer, but travel to the island of "Java" may not be classified as a useful skill to a computer programmer. In contrast, programming in the language "Java" may not be classified as a useful skill to a travel agent, but travel to the island of "Java" may be classified as a useful experience for a travel agent. In this way, generating multiple language models and, as described herein, selecting a language model and associated catalog for use in parsing documents based on relevancy determinations, improves an accuracy of predictions relative to using a single static language model and catalog (e.g., which may apply equal wait to an element, such as "Java" in all contexts).

In some aspects, elements may have different relative weights in different language models when the different language models are associated with different natural language processing techniques (e.g., different techniques may evaluate the same word as having different importance), different catalogs (e.g., different catalogs of different types of skill extractions from different language models may evaluate the same word as having different importance), or a combination thereof. In this case, an element may include a word, a phrase, a sentence, a document segment, or a paragraph, among other examples.

As shown in FIG. 1B, and by reference number 152, language processing system 102 may analyze keyword sets, which may also be termed "keyword groups", based on the set of language models. For example, language processing system 102 may identify multiple keyword sets K for each model M (e.g., each model M may be associated with a set of keyword groups, with each keyword group having multiple keywords). In this case, language processing system 102 may identify a first keyword set $\{K_{1,1,1,\ldots}\}$ using a first natural language processing technique applied to a first model $M_1$, identify an xth keyword set $\{K_{1,X,1,\ldots}\}$ using an xth natural language processing technique applied to the first model $M_1$, and identify an xth keyword set $\{K_{N,X,1,\ldots}\}$ using the xth natural language processing technique applied to an nth model $M_N$. For example, language processing system 102 may analyze a first language model to determine keywords for generating a skill catalog. In this case, for a language model $M_i$ associated with a dataset $L_i$ relating to job descriptions for computer programming, language processing system 102 may identify keywords $K_i$, such as "Programming", "Java", "AI", etc. Similarly, for a language model $M_j$ associated with a dataset $L_j$ of employees at financial services organizations, language processing system 102 may identify keywords $K_j$, such as "Banking", "Currency Trading", "Forex", etc.

Figure 1C:
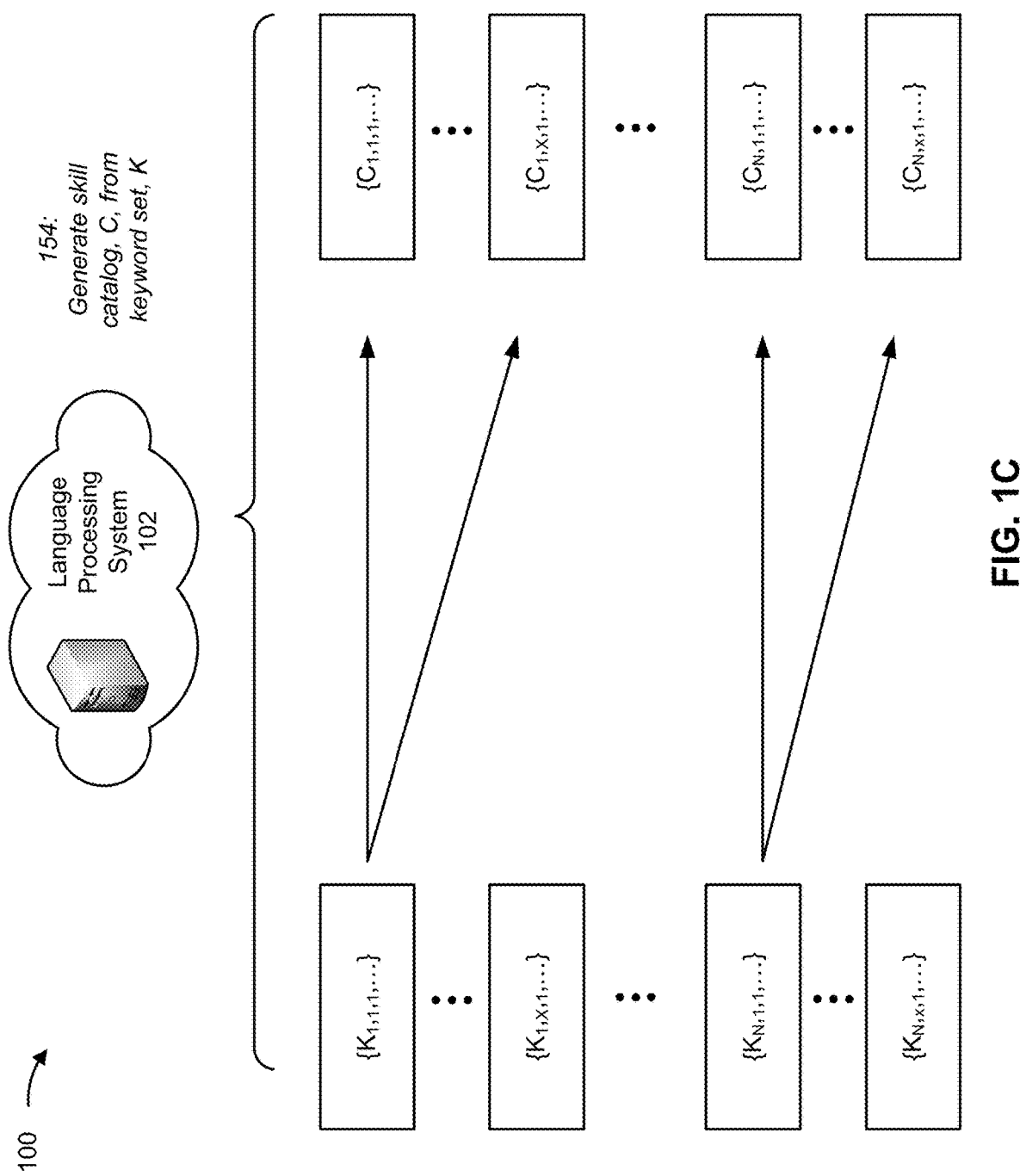

As shown in FIG. 1C, and by reference number 154, language processing system 102 may generate skill catalogs based on the keyword sets. For example, language processing system 102 may generate multiple skill catalogs C from each keyword set K and model M. In other words, each model M may have multiple associated skill catalogs C. In this case, language processing system 102 may generate a first skill catalog set $\{C_{1,1,1,\ldots}\}$ using a first keyword set $\{K_{1,1,1,\ldots}\}$, an xth skill catalog $\{C_{1,X,1,\ldots}\}$ using the first keyword set $\{K_{1,X,1,\ldots}\}$, . . . , an xth skill catalog $\{C_{N,X,1,\ldots}\}$ using an xth keyword set $\{K_{N,X,1,\ldots}\}$. As used herein the terms "X" and "xth" may refer to any number, such that an xth keyword set may be the same or a different "number" keyword set as an xth skill catalog, for example. A catalog may be a data set of entities extracted from within a threshold proximity of key entities. In other words, a skill catalog may be a catalog, for identifying skills (e.g., for use in matching prospective employees to jobs or current employees to roles), that includes a set of words extracted from a linguistic neighborhood of a keyword using a model. For example, language processing system 102 may extract words in a linguistic neighborhood of keyword $K_j$ using a language model $M_i$ and denote the extracted words as catalog $C:=\{C_{i,j,1}, C_{i,j,2}, \ldots, C_{i,j,X}\}$. In some implementations, language processing system 102 may generate many skill catalogs. For example, language processing system 102 may generate hundreds of thousands or even millions of skill catalogs based on analyzing different combinations of language models and keyword sets using different processing techniques. Language processing system 102 may periodically update the skill catalogs. For example, language processing system 102 may monitor changes to data sources from which the language models M and/or keywords K are determined and may update the skill catalogs as the data sources change (e.g., additional information is added or existing information is removed).

In some implementations, language processing system 102 may perform clustering of skills within a skill catalog. For example, language processing system 102 may determine a linkage between a first skill and a second skill in the skill catalog based on semantic linkages in an underlying language model associated with the skill catalog. In this case, based on the linkage being dependent on the underlying language model, a pair of skills may have different linkages in different contexts. As an example, two skills "programming" and "Python" may be closely linked in a first skill catalog built using a computer-science related data set and language model (e.g., an encyclopedia description of a software company) but may be poorly linked in a second skill catalog built using a zoology related data set and language model (e.g., an academic database of studies of reptiles). In this way, when language processing system 102 selects a skill catalog most appropriate for analyzing the document, as described herein, skill clustering is configured to ensure that language processing system 102 differentiates between semantic similarity in different contexts. In other words, when language processing system 102 selects the first skill catalog, language processing system 102 may analyze the two skills as close to interchangeable and weighted nearly equally. In contrast, when language processing system 102 selects the second skill catalog, language processing system 102 may analyze the two skills differently and with very different weights. In some implementations, language processing system 102 may determine a rareness of skills in different skill catalogs. For example, language processing system 102 may identify outlier skills that are rare among job listings or among resumes, and may apply weights based on a rareness of skills (e.g., a rare skill may receive a lower weight to avoid eliminating too many resumes and not identifying any match to a job opportunity). In some cases, language processing system 102 may tune weights based on results of matching, as described herein, to ensure that at least one match is identified or at least a threshold quantity of matches is identified (where a match indicates a threshold similarity score).

Figure 1D:
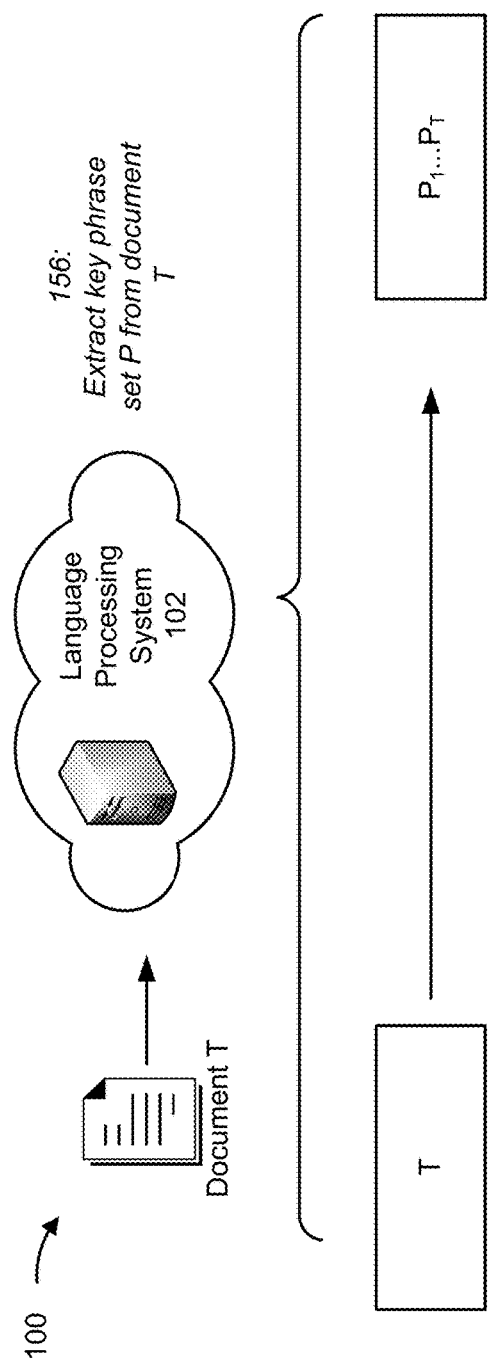

As shown in FIG. 1D, and by reference number 156, language processing system 102 may extract a key phrase set from a document. For example, language processing system 102 may extract key phrase set P ($P_1$ to $P_T$) from a document T. In this case, to determine a most appropriate skill catalog (of the many skill catalogs C), language processing system 102 may select a source document (e.g., a job offer to which to match a job candidate, or a resume to match to job offers) and extract key phrases from the source document using natural language processing.

In some implementations, language processing system 102 may generate the source document. For example, language processing system 102 may communicate with one or more data servers storing employment history information for a user and may automatically generate a resume that includes work history information or job description information, among other examples. In this case, language processing system 102 may provide a user interface with which the user can provide additional information, such as self-promotion information (e.g., information indicating a relative importance or strength of each item of work history, information indicating career goals, or information indicating a relative strength of a skill or a desire to a skill that is identified on the resume, among other examples).

Figure 1E:
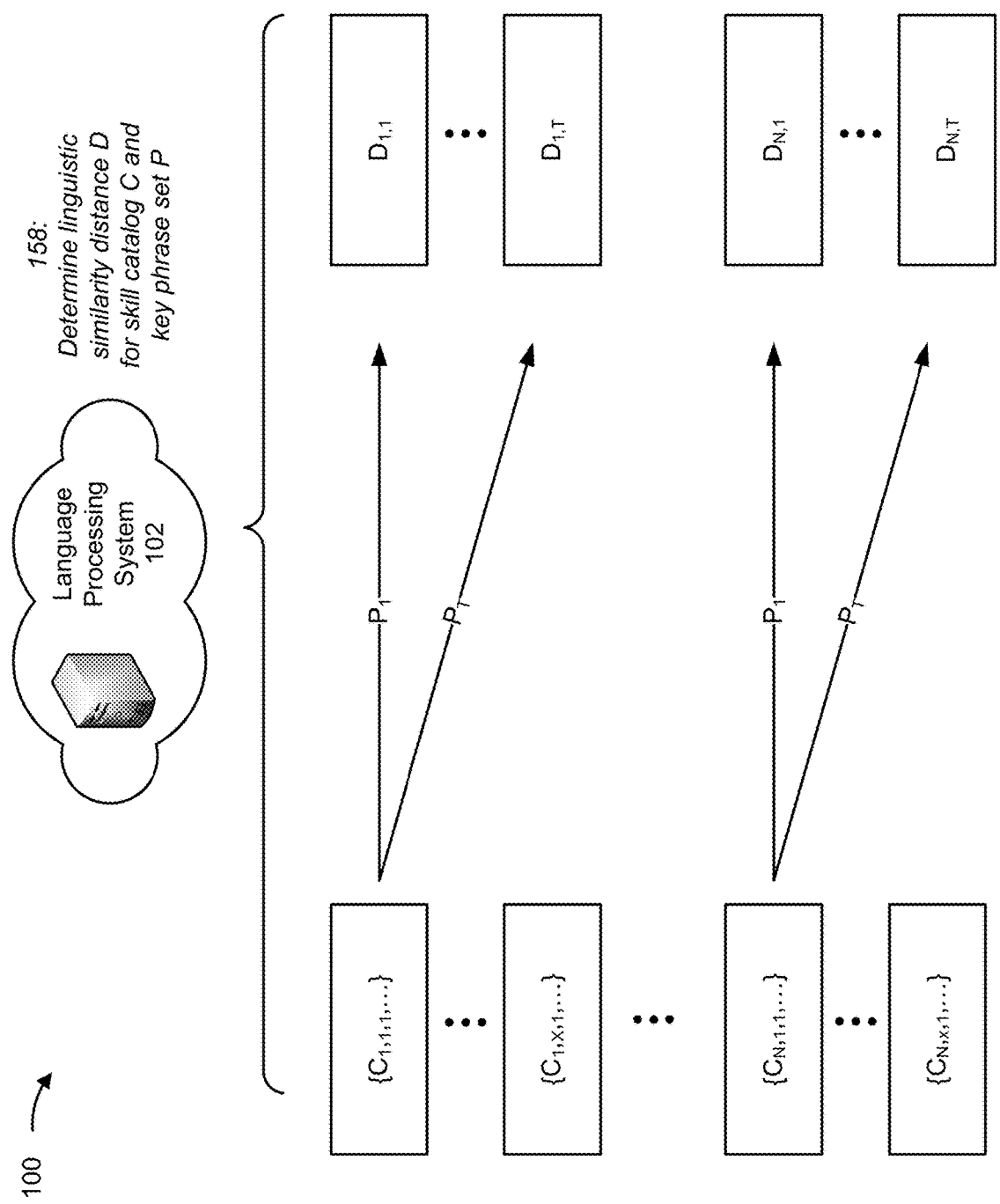

As shown in FIG. 1E, and by reference number 158, language processing system 102 may determine linguistic similarity distances for skill catalogs and key phrase sets. For example, language processing system 102 may determine linguistic similarities D based on skill catalogs C and key phrase sets P. In other words, language processing system 102 may determine similarity distances between each key phrase of a key phrase set and each element (e.g., skill, word, phrase, sentence, document segment, or paragraph, among other examples) of a skill catalog, and may aggregate the similarity distances to determine an aggregate similarity distance (or "relevancy value"), as described herein, representing a relevance of a skill catalog to the source document. Based on relevancy values for each skill catalog, language processing system 102 may select a particular skill catalog and a particular language model to use when analyzing the source document (e.g., in relation to one or more target documents). Although some aspects are described herein in terms of document analysis, language processing system 102 or a similar system may process other types of source content and target content, such as audio content, video content, and/or the like.

Language processing system 102 may determine a first linguistic similarity distance $D_{1,1}$ for a first skill catalog $\{C_{1,1,1}, \ldots\}$ and a first key phrase set $P_1$, an xth similarity distance $D_{1,T}$ for the first skill catalog $\{C_{1,X,1}, \ldots\}$ and an xth key phrase set $P_T$, an xth similarity distance $D_{N,T}$ for an xth skill catalog $\{C_{N,1,1}, \ldots\}$ and the first key phrase set $P_1$, etc. For example, language processing system 102 may determine linguistic similarity distances $D:=\{D_{1,1}, \ldots\}$ for each possible skill catalog and each possible key phrase $P_i$ of the key phrase set P. In this case, for each possible skill catalog, language processing system 102 may determine an average f(D) of the linguistic similarity distances D, and may compare the average (or another statistical metric) of the linguistic similarity distances to select a skill catalog and associated language model, as described herein.

Figure 1F:
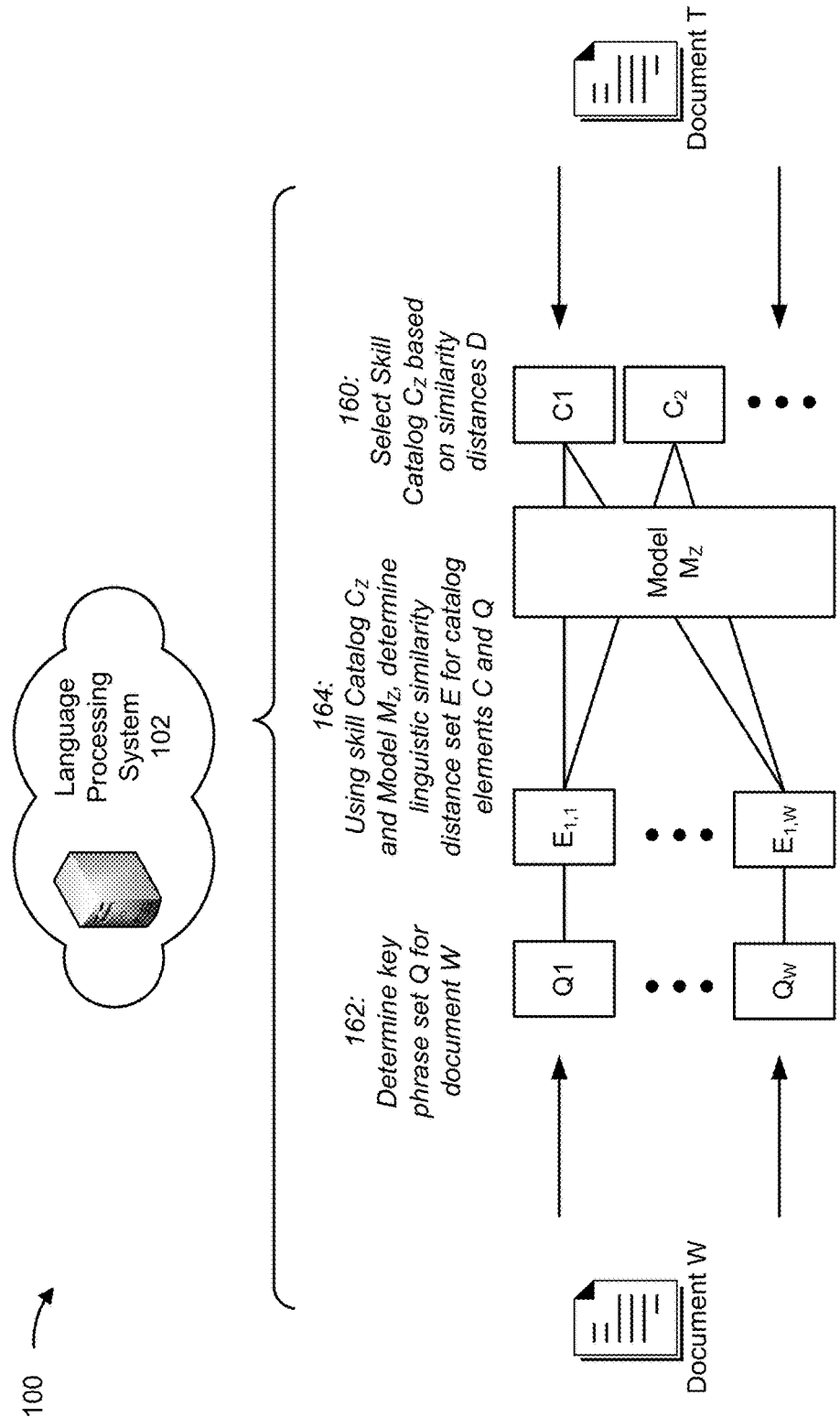

As shown in FIG. 1F, and by reference number 160, language processing system 102 may select a skill catalog based on the linguistic similarity distances. For example, language processing system 102 may select skill catalog $C_Z$ based on the linguistic similarity distances D. In this case, language processing system 102 may select a skill catalog $C_Z \in C$, where max(f(D)) is $C_Z$. In other words, language processing system 102 may dynamically select a skill catalog, which may be termed a "dynamic skill catalog" for the source document, that has the best similarity distance (e.g., is closest in similarity) between words in the skill catalog and key phrases in the source document. In this case, language processing system 102 may score a relation between a skill catalog $C_Z$, an associated language model $M_Z$, and the target document W. In another example, language processing system 102 may select the skill catalog based on the source document T. In some implementations, language processing system 102 may select the skill catalog based on a combination of source document T and target document W.

As an example, language processing system 102 may analyze three language models and three skill catalogs for similarity to target document W and may identify the skill catalog C and the model M that combine for a highest relevance to target document W. In this case, language processing system 102 may select the skill catalog C and the model M for analyzing the target document W with respect to the source document T. In this way, language processing system 102 dynamically selects a skill catalog and language model for analyzing a similarity between target document W and source document T, thereby improving matching relative to using a single skill catalog or language model.

As further shown in FIG. 1F, and by reference number 162, language processing system 102 may determine a key phrase set for a target document. For example, language processing system 102 may determine a key phrase set $Q:=\{Q_1 \ldots Q_W\}$ for a target document W. As further shown in FIG. 1F, and by reference number 164, language processing system 102 may determine a linguistic similarity distance set. For example, using skill catalog $C_Z$ and language model $M_Z$ that is associated with selected skill catalog $C_Z$, language processing system 102 may determine a linguistic similarity distance set $E:=\{E_{1,1} \ldots E_{1,W}\}$ for respective catalog elements $C:=\{C_1 \ldots\}$ and $Q:=\{Q_1 \ldots\}$.

In some implementations, language processing system 102 may perform filtering of the skill catalog when analyzing the source document and target document. For example, language processing system 102 may extract skills from the skill catalog that are relevant to the source document or the target document. In this case, language processing system 102 may discard skills not relevant (e.g., not included in) either of the source document or the target document, thereby reducing an amount of processing relative to determining a comparison using all skills from the skill catalog.

In some implementations, language processing system 102 may perform scoring using the language model. For example, using the skills extracted from the skill catalog, language processing system 102 may use the language model to determine a semantic similarity, importance, and/or weight for the target and source documents in light of the extracted skills. In other words, if the source document includes a "data analysis" skill, language processing system 102 may use the language model to determine a semantic similarity between the "data analysis" skill and a "MySQL" skill in the target document.

In this case, language processing system 102 may determine an average similarity distance based on the linguistic similarity distance set avg(E)=f(E) and may generate a similarity score Y representing a linguistic similarity between source document T and target document W with respect to skill catalog $C_Z$ and model $M_Z$. In a context of a source document T representing a job offering for a job T and target document W representing a resume of a user W, language processing system 102 may determine the similarity score as a representation of a suitability of user W for job T. In this case, language processing system 102 may analyze thousands or millions of possible target documents W (each with respective key phrase sets Q) to determine a highest similarity score indicating a best match between a user and a job offering.

In some implementations, language processing system 102 may weight similarity scores based on semantic interpretation of source document T and target document W. For example, language processing system 102 may determine that a particular key phrase in a skill catalog (e.g., representing a particular skill) is associated with a semantic context indicating a relative importance of the particular phrase ("I am very interested in Java programming" indicating a strong importance of a particular skill). In this case, language processing system 102 may weight an overall similarity score more heavily toward similarity distances E relating to the particular skill (and less heavily toward similarity distances $E_j$ relating to other skills). In this way, language processing system 102 performs a higher-level mapping of employees to jobs than is performed using static non-weighted skill mapping. By performing the higher-level mapping, language processing system 102 improves an accuracy of matches, thereby increasing a likelihood that a match is accurate and reducing an amount of results that need to be provided to ensure at least one accurate match as well as reducing a waste of computing resources associated with inaccurate recommendations based on an inaccurate match.

Figure 1G:
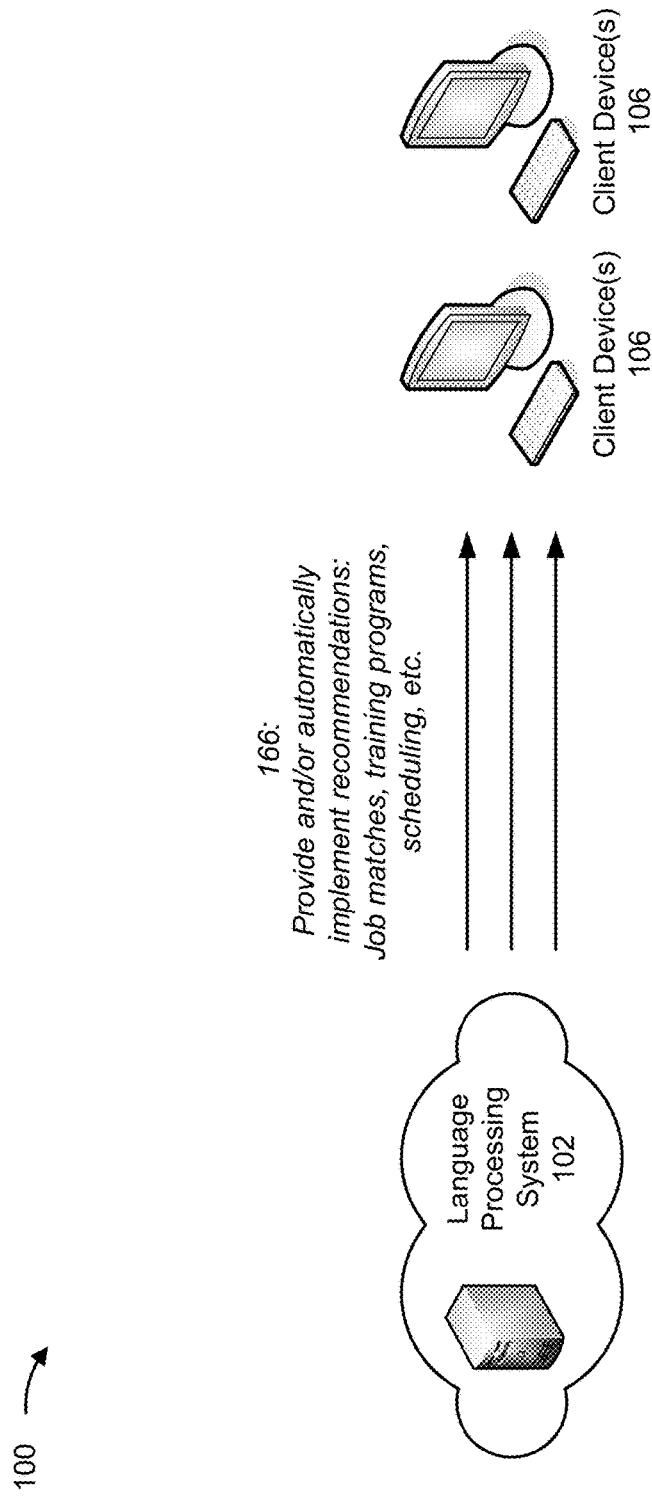

As shown in FIG. 1G, and by reference number 166, language processing system 102 may provide and/or implement one or more recommendations. For example, language processing system 102 may communicate with client devices 106 to provide information associated with a result of determining the linguistic similarity distance set. In this case, language processing system 102 may automatically implement a recommendation, such as by automatically transmitting an offer letter to a prospective employee with a resume matching a job opening, automatically scheduling a training program to improve a resume of a prospective employee, automatically generating a calendar entry in a calendar of a hiring manager to interview a prospective employee, automatically removing a job opening from a list, or automatically generating a new job opening to fill a role vacated by a prospective employee matched to a new job, among other examples described herein.

In some implementations, language processing system 102 may provide and/or implement a hiring recommendation. For example, language processing system 102 may match a job description for an IT engineer with a financial services company (e.g., skills in this case could be a first cluster of IT: {"Java", "Python", "C#", "R"} and a second cluster of Financial Services: {"Loan Processing", "Forex Trading"}) to a resume (e.g., identified skills could be "MySQL" which may be semantically linked to one or more of the IT skills, and "Quantitative analysis" which may be semantically linked to one or more of the Financial Services skills). In this case, language processing system 102 may weight the relative importance and closeness of each match and, when the resume achieves a threshold similarity score, provide a hiring recommendation of a prospective employee associated with the resume.

In some implementations, language processing system 102 may provide an output of a similarity score. For example, based on determining the similarity score of a source document and a target document (e.g., based on a linguistic analysis of skills, terms, phrases, or sentences, among other examples), language processing system 102 may provide the similarity score as output via a dashboard or user interface of, for example, a client device 106. In this case, the dashboard may include overall similarity scores, similarity scores specific to skill clusters (e.g., in the above example, a first similarity score for the IT skill cluster may be generated and a second similarity score for the Financial Services skill cluster may be generated, from which an overall similarity score may be generated). For example, language processing system 102 may enable filtering of candidates by skill cluster similarity scores to enable a resume to be identified that matches a threshold similarity score in a particular skill cluster (e.g., IT), even if the overall similarity score does not satisfy a threshold (e.g., thereby allowing identification of candidates with more important skills to a particular job opportunity, such as IT skills, and training of those candidates to gain less important skills, such as Financial Services skills). In this case, language processing system 102 may automatically recommend training to improve skills in skill clusters for which a similarity score does not satisfy a threshold.

In some implementations, language processing system 102 may provide an output based on analyzing the source document or the target document. For example, language processing system 102 may analyze unstructured data of a job opportunity document to extract semantic contexts of skills (e.g., whether identified skills are required or optional). Similarly, language processing system 102 may analyze unstructured data of a resume document to extract semantic contexts of skills (e.g., a listing of skills and a quantity of years using the skills, or a listing of employment industries and a quantity of years in the employment industries, among other examples). In this way, language processing system 102 enables qualitative evaluations, such as an identification of why a prospective employee is matched to a job, what skills a prospective employee should gain to be matched to the job in the future, what training to provide to a prospective employee, or a market value of a skill of an employee, among other examples.

Based on determining the structured data, language processing system 102 may automatically provide recommendations using a trained recommendation model (e.g., which may be trained using supervised machine learning to identify recommendations from results of analyzing documents and attempting to match a resume to a job opportunity). For example, when language processing system 102 identifies a poor similarity between a resume and a job opportunity, language processing system 102 may simulate a result of analyzing a changed version of the resume and the job opportunity (e.g., by using artificial intelligence to simulate a change to, for example, a skill and a quantity of years with the skill). In this case, when language processing system 102 identifies a better match of the changed version of the resume and the job opportunity, language processing system 102 may provide output identifying a recommendation. As a particular example, language processing system 102 may determine that adding an additional computer programming language with a certain quantity of years of experience to a resume changes the resume from having less than a threshold similarity score to having greater than or equal to a threshold similarity score. In this case, language processing system 102 may provide output recommending training in the additional computer programming language and assignment to a role that uses the additional computer programming language. In this way, language processing system 102 automatically identifies roles to promote career growth and cause improved future employment prospects.

As indicated above, FIGS. 1A-1G are provided as an example. Other examples may differ from what is described with regard to FIGS. 1A-1G.

Figure 2:
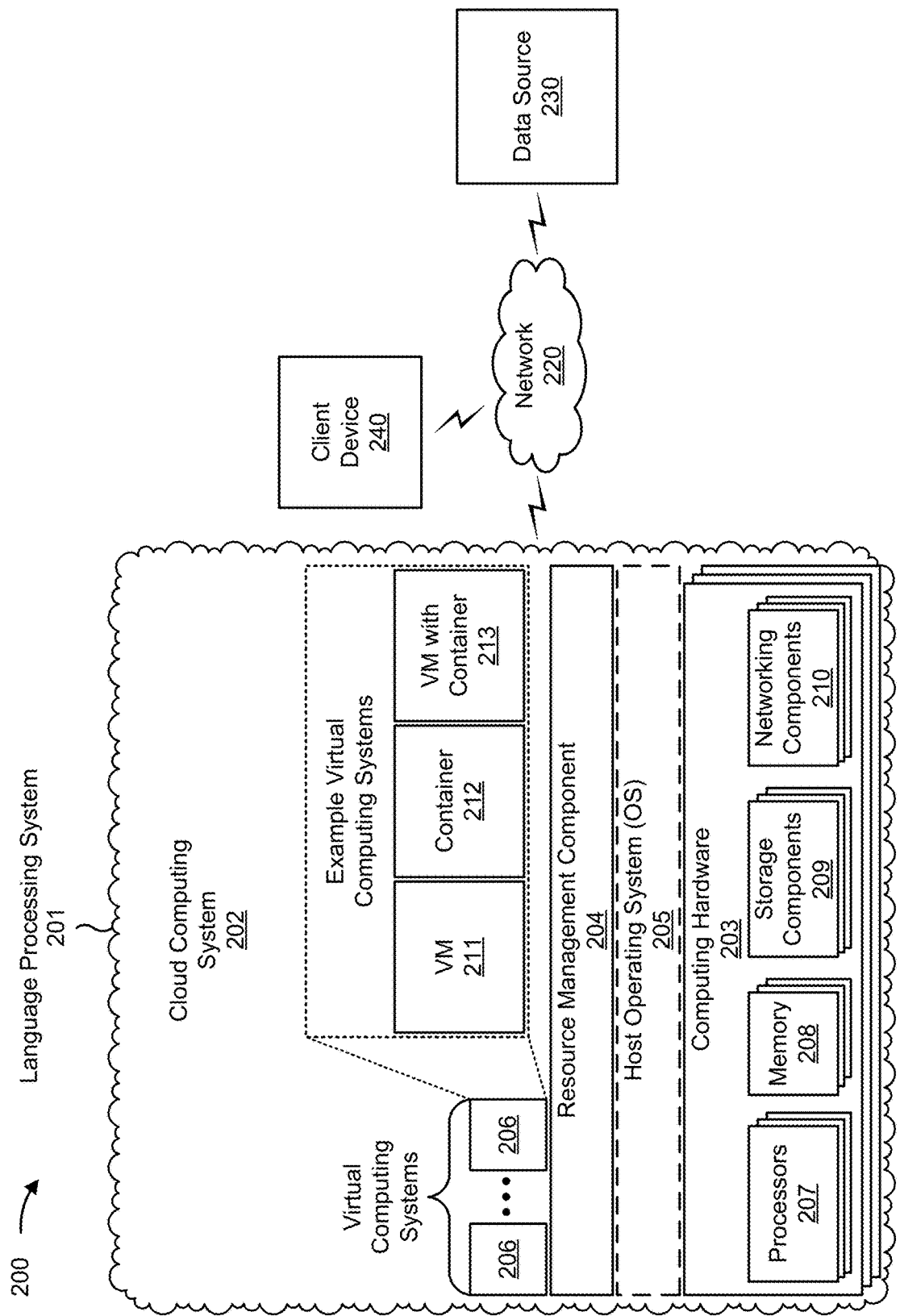
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a language processing system 201, which may include one or more elements of and/or may execute within a cloud computing system 202. The cloud computing system 202 may include one or more elements 203-213, as described in more detail below. As further shown in FIG. 2, environment 200 may include a network 220, a data source 230, and/or a client device 240. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, or a hybrid environment 213 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the language processing system 201 may include one or more elements 203-213 of the cloud computing system 202, may execute within the cloud computing system 202, and/or may be hosted within the cloud computing system 202, in some implementations, the language processing system 201 may not be cloud-based (e.g., may be implemented outside of a cloud computing system) or may be partially cloud-based. For example, the language processing system 201 may include one or more devices that are not part of the cloud computing system 202, such as device 300 of FIG. 3, which may include a standalone server or another type of computing device. The language processing system 201 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or a combination of these or other types of networks. The network 220 enables communication among the devices of environment 200.

The data source 230 includes one or more devices capable of receiving, generating, storing, processing, and/or providing information associated with generating one or more language models, identifying one or more keywords or key phrases, and/or comparing documents to determine semantic similarity, as described elsewhere herein. The data source 230 may include a communication device and/or a computing device. For example, the data source 230 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data source 230 may communicate with one or more other devices of environment 200, as described elsewhere herein.

The client device 240 includes one or more devices capable of receiving, generating, storing, processing, and/or providing information associated with comparing documents using natural language processing techniques, multiple language models, and/or multiple catalogs, as described elsewhere herein. The client device 240 may include a communication device and/or a computing device. For example, the client device 240 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
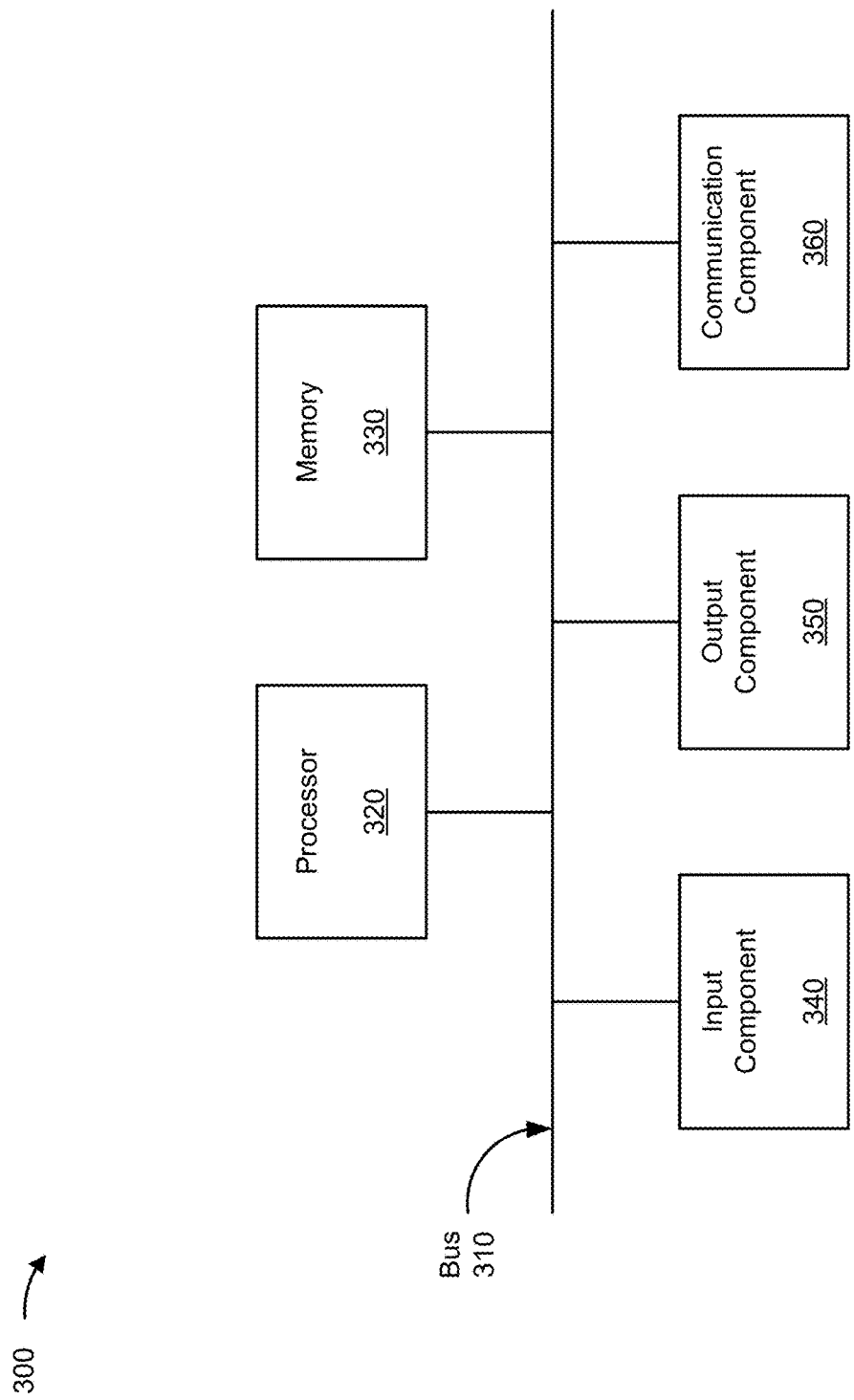
FIG. 3 is a diagram of example components of one or more devices of FIG. 2.

FIG. 3 is a diagram of example components of a device 300, which may correspond to language processing system 201, data source 230, and/or client device 240. In some implementations, language processing system 201, data source 230, and/or client device 240 may include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
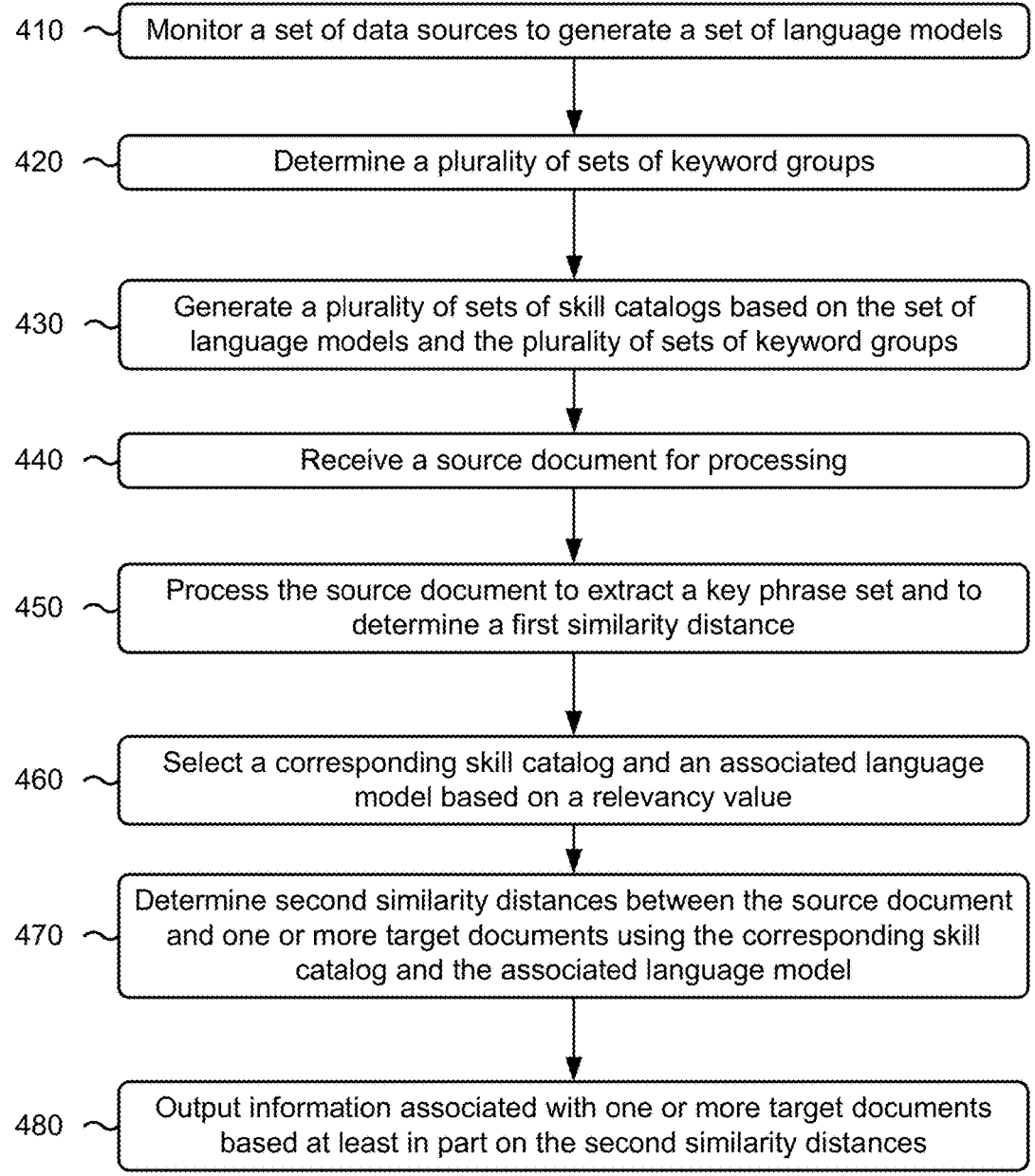
FIG. 4 is a flowchart of an example process relating to a multi-model approach to natural language processing and recommendation generation.

FIG. 4 is a flowchart of an example process 400 associated with multi-model approach to natural language processing and recommendation generation. In some implementations, one or more process blocks of FIG. 4 may be performed by a language processing system (e.g., language processing system 102 or language processing system 201). In some implementations, one or more process blocks of FIG. 4 may be performed by another device or a group of devices separate from or including the language processing system, such as a data source (e.g., data source(s) 104 or data source 230) and/or a client device (e.g., client device(s) 106 or client device 240). Additionally, or alternatively, one or more process blocks of FIG. 4 may be performed by one or more components of device 300, such as processor 320, memory 330, input component 340, output component 350, and/or communication component 360.

As shown in FIG. 4, process 400 may include monitoring a set of data sources to generate a set of language models (block 410). For example, the device may monitor a set of data sources to generate a set of language models corresponding to the set of data sources, as described above.

As further shown in FIG. 4, process 400 may include determining a plurality of sets of keyword groups (block 420). For example, the device may determine a plurality of sets of keyword groups for the set of language models such that each language model, of the set of language models, is associated with a corresponding set of keyword groups, as described above.

As further shown in FIG. 4, process 400 may include generating a plurality of sets of skill catalogs based on the set of language models and the plurality of sets of keyword groups (block 430). For example, the device may generate a plurality of sets of skill catalogs based on the set of language models and the plurality of sets of keyword groups, such that each keyword group is associated with a skill catalog of the plurality of sets of skill catalogs, and such that each language model, of the set of language models, is associated with a corresponding set of skill catalogs, as described above.

As further shown in FIG. 4, process 400 may include receiving a source document for processing (block 440). For example, the device may receive, based on generating the set of language models for each dynamic catalog, a source document for processing, as described above.

As further shown in FIG. 4, process 400 may include processing the source document to extract a key phrase set and to determine a first similarity distance (block 450). For example, the device may process the source document to extract a key phrase set and to determine, for each key phrase of the key phrase set, a first similarity distance to each skill of a corresponding skill catalog of the plurality of sets of skill catalogs, wherein an average of similarity distances for the corresponding skill catalog represents a relevancy between the target content, the corresponding skill catalog, and an associated language model, as described above.

As further shown in FIG. 4, process 400 may include selecting a corresponding skill catalog and an associated language model based on a relevancy value (block 460). For example, the device may select the corresponding skill catalog and the associated language model based on the relevancy value, as described above.

As further shown in FIG. 4, process 400 may include determining second similarity distances between the source document and one or more target documents using the corresponding skill catalog and the associated language model (block 470). For example, the device may determine second similarity distances between the source document and one or more target documents using the corresponding skill catalog and the associated language model, as described above.

As further shown in FIG. 4, process 400 may include outputting information associated with one or more target documents based at least in part on the second similarity distances (block 480). For example, the device may output information associated with one or more target documents based at least in part on the second similarity distances, as described above.

Process 400 may include additional implementations, such as any single implementation or any combination of implementations described below and/or in connection with one or more other processes described elsewhere herein.

In a first implementation, an element is associated with a first weight in a first language model and a second weight in a second language model.

In a second implementation, alone or in combination with the first implementation, the first language model and the second language model are associated with one of the same catalog and different natural language processing techniques, different catalogs and the same natural language processing technique, or different catalogs and different natural language processing techniques.

In a third implementation, alone or in combination with one or more of the first and second implementations, the element is at least one of a word, a phrase, a sentence, or a document segment.

In a fourth implementation, alone or in combination with one or more of the first through third implementations, determining the second similarity distances comprises determining a strength of a first element in the source document based on the corresponding catalog and associated language model and one or more second elements contextually related to the target content, and determining a similarity score based on the strength of the first element.

In a fifth implementation, alone or in combination with one or more of the first through fourth implementations, determining the second similarity distances comprises extracting first elements from a target document of the one or more target documents, comparing second elements of the corresponding catalog and the first elements using the associated language model, and determining the second similarity distances based on the comparison of the second elements and the first elements.

In a sixth implementation, alone or in combination with one or more of the first through fifth implementations, processing the source document to extract the key phrase set and to determine, for each key phrase of the key phrase set, the first similarity distance, comprises extracting the key phrase set from the source document using the corresponding language model, determining, for a key phrase of the key phrase set, a corresponding first similarity distance representing a similarity of the key phrase to each element of the corresponding catalog, aggregating corresponding first similarity distances for the key phrase set to determine an aggregate similarity of the corresponding catalog to the key phrase, and selecting the corresponding skill catalog comprises selecting the corresponding skill catalog based on the aggregate similarity.

In a seventh implementation, alone or in combination with one or more of the first through sixth implementations, determining the second similarity distances comprises filtering elements, to generate a set of filtered elements, of the source document and a target document of the one or more target documents using the corresponding skill catalog, and scoring the filtered elements using the associated language model.

In an eighth implementation, alone or in combination with one or more of the first through seventh implementations, determining the second similarity distances comprises averaging the second similarity distances is an average of the set of similarity distances.

In a ninth implementation, alone or in combination with one or more of the first through eighth implementations, the source document is a job posting and the one or more target documents is a set of job postings.

In a tenth implementation, alone or in combination with one or more of the first through ninth implementations, the source document is a resume and the one or more target documents is a set of resumes.

In an eleventh implementation, alone or in combination with one or more of the first through tenth implementations, process 400 includes generating, using a recommendation engine, a set of recommendations based on the similarity scores, and outputting information associated with the set of recommendations.

In a twelfth implementation, alone or in combination with one or more of the first through eleventh implementations, process 400 includes performing a set of automated response actions related to the set of recommendations.

In a thirteenth implementation, alone or in combination with one or more of the first through twelfth implementations, the set of automated response actions includes a response action relating to at least one of an enrollment in a training program, a scheduling of a meeting, an assignment of a task, a content retrieval task, a submission of the target content, or a response to a job posting.

In a fourteenth implementation, alone or in combination with one or more of the first through thirteenth implementations, process 400 includes determining, based on the similarity scores, whether a set of thresholds relating to a set of categories is satisfied, wherein a category corresponds to an element of the associated dynamic catalog, and outputting the information associated with the set of recommendations comprises updating one or more data entries in a management system to indicate that the set of thresholds is satisfied.

In a fifteenth implementation, alone or in combination with one or more of the first through fourteenth implementations, process 400 includes converting, using the selected language model, unstructured data of the source content into structured content, and processing the source content comprises processing the structured content.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:

monitoring, by a device, a set of data sources to obtain data sets comprising corpuses;

generating, by the device, from the corpuses and by applying an artificial intelligence natural language processing technique, a set of language models corresponding to the set of data sources, each language model relating to specific job descriptions that include descriptions of specific skills;

determining, by the device using the artificial intelligence natural language processing technique applied to the set of language models, a plurality of sets of keyword groups for the set of language models such that each language model, of the set of language models, is associated with a corresponding set of keyword groups based on each language model relating to the specific job descriptions;

generating, by the device, a plurality of sets of skill catalogs based on the set of language models and the plurality of sets of keyword groups, such that each keyword group is associated with a skill catalog of the plurality of sets of skill catalogs, and such that each language model, of the set of language models, is associated with a corresponding set of skill catalogs, wherein each skill catalog includes a set of words for identifying skills, and wherein the set of words are extracted from a linguistic neighborhood of a keyword of a keyword group, using the language model and using the keyword group corresponding to the language model;

receiving, by the device, a source document for processing;

processing, by the device, the source document, wherein processing the source document includes extracting a key phrase set and determining, for each key phrase of the key phrase set, a first similarity distance to each skill of a corresponding skill catalog of the plurality of sets of skill catalogs, wherein extracting the key phrase set includes extracting the key phrase set from the source document using the language model, and wherein determining the first similarity distance includes:

determining a linguistic similarity distance between each key phrase of the key phrase set and each element of a skill catalog, each element including at least one of a word, a phrase, a sentence, or a document segment, and aggregating linguistic similarity distances to determine an aggregate linguistic similarity distance that represents a relevancy value of the skill catalog to the source document;

selecting, by the device, the corresponding skill catalog and an associated language model based on the relevancy value;

obtaining, by the device, one or more target documents;

processing, by the device, the one or more target documents, wherein processing the one or more target documents includes extracting a key phrase set of the one or more target documents using the associated language model;

determining second similarity distances between the source document and the one or more target documents using the corresponding skill catalog and the associated language model, wherein the second similarity distances represent a set of linguistic similarity distances between elements of the corresponding skill catalog and the key phrase set of the one or more target documents; and outputting information associated with one or more target documents based at least in part on the second similarity distances.

2. The method of claim 1, wherein at least one element of the skill catalog is associated with a first weight in a first language model and a second weight in a second language model.

3. The method of claim 2, wherein the first language model and the second language model are associated with one of:

a same skill catalog and different natural language processing techniques, different skill catalogs and a same natural language processing technique, or different skill catalogs and different natural language processing techniques.

4. The method of claim 1, wherein determining the second similarity distances comprises:

determining a strength of a first element in the source document based on the corresponding skill catalog and associated language model and one or more second elements contextually related to a target document of the one or more target documents; and determining a similarity score based on the strength of the first element.

5. The method of claim 1, wherein determining the second similarity distances comprises:

extracting first elements from a target document of the one or more target documents;

comparing second elements of the corresponding skill catalog and the first elements using the associated language model; and determining the second similarity distances based on the comparison of the second elements and the first elements.

6. The method of claim 1, wherein determining the second similarity distances comprises:

filtering the elements, to generate a set of filtered elements, of the source document and a target document of the one or more target documents using the corresponding skill catalog; and scoring the filtered elements using the associated language model.

7. The method of claim 6, wherein determining the second similarity distances further comprises:

Determining an average similarity distance based on the set of similarity distances.

8. The method of claim 1, wherein the source document is a job posting and the one or more target documents are a set of job postings.

9. The method of claim 1, wherein the source document is a resume and the one or more target documents are a set of resumes.

* * * * *